(12) United States Patent
Sturiale

(10) Patent No.: US 11,206,807 B1
(45) Date of Patent: Dec. 28, 2021

(54) COLLAPSIBLE PET CARRIER

(71) Applicant: Jennifer Sturiale, Portland, OR (US)

(72) Inventor: Jennifer Sturiale, Portland, OR (US)

( * ) Notice: Subject to any disclaimer, the term of this patent is extended or adjusted under 35 U.S.C. 154(b) by 288 days.

(21) Appl. No.: 16/572,093

(22) Filed: Sep. 16, 2019

Related U.S. Application Data

(63) Continuation-in-part of application No. 29/678,134, filed on Jan. 25, 2019, now Pat. No. Des. 895,903.

(51) Int. Cl.
    *A01K 1/02*     (2006.01)
    *A01K 27/00*     (2006.01)
    *A01K 1/06*     (2006.01)

(52) U.S. Cl.
    CPC ............ *A01K 1/029* (2013.01); *A01K 1/0254* (2013.01); *A01K 27/008* (2013.01); *A01K 1/06* (2013.01); *A01K 27/003* (2013.01)

(58) Field of Classification Search
    CPC ..... A01K 1/029; A01K 1/0254; A01K 27/008
    See application file for complete search history.

(56) References Cited

U.S. PATENT DOCUMENTS

| | | | |
|---|---|---|---|
| 3,850,144 A | 11/1974 | Springer | |
| 4,301,547 A | 11/1981 | Bloise | |
| 4,644,902 A | 2/1987 | Doyle | |
| 4,977,857 A | 12/1990 | Slawinski | |
| 5,176,102 A | 1/1993 | Tracy | |
| D367,359 S | 2/1996 | Smith | |
| 5,671,698 A | 9/1997 | Farrugia | |
| D398,082 S | 9/1998 | Martz | |
| D442,748 S | 5/2001 | Farrugia | |
| 6,286,461 B1 | 9/2001 | Martz | |
| 6,701,871 B1 | 3/2004 | Johnson | |
| 6,866,009 B2 | 3/2005 | Smith, Jr. et al. | |
| D547,059 S | 7/2007 | Keller | |
| D549,400 S | 8/2007 | Gold et al. | |
| 7,395,555 B2 | 7/2008 | Aldridge et al. | |
| D575,461 S | 8/2008 | Cannon et al. | |
| 7,617,917 B2 | 11/2009 | Hai et al. | |
| 8,261,698 B1* | 9/2012 | McClain | A01K 1/0254 119/501 |
| D677,011 S | 2/2013 | Cirincione et al. | |
| D685,952 S | 7/2013 | Dixon | |
| 8,607,740 B2 | 12/2013 | Webb | |

(Continued)

OTHER PUBLICATIONS

Timetuu Pet Sling Carrier, Ispaz866, nternet ebay, Aug. 22, 2919, p. 1-5.

(Continued)

*Primary Examiner* — Jessica B Wong
(74) *Attorney, Agent, or Firm* — Alfred M. Walker

(57) ABSTRACT

A collapsible pet carrier is lightweight and folds into an integral, flat sewn-in pocket for storage. The collapsible pet carrier includes an internal leash which safely secures a pet in place within the carrier while not unduly restricted the movement of the pet within the pet carrier during transport of the pet. The collapsible pet carrier includes an adjustable shoulder strap which can be worn cross body by the user so that the pet carrier will not slip from the body of the user. A screened ventilation panel moderates the internal air temperature of the pet carrier bag. The pet carrier is provided with a soft, rectangular shape during use, which minimizes the chances of a pet escaping or slipping out therefrom.

18 Claims, 8 Drawing Sheets

(56) References Cited

U.S. PATENT DOCUMENTS

| | | |
|---|---|---|
| D717,502 S | 11/2014 | Dixon |
| D759,319 S | 6/2016 | Chang |
| D778,595 S | 2/2017 | Zurowski |
| 9,781,901 B2 | 10/2017 | Rivera |
| D804,108 S | 11/2017 | Torres |
| D804,738 S | 12/2017 | Nourollah |
| D808,084 S | 1/2018 | Lu |
| D808,596 S | 1/2018 | Veness |
| 2008/0184941 A1* | 8/2008 | Hai ................. A01K 1/0254 119/497 |
| 2014/0230748 A1* | 8/2014 | Renforth ........... A01K 1/0254 119/496 |
| 2016/0000198 A1* | 1/2016 | Labadini ............. A45C 9/00 119/797 |
| 2017/0013807 A1* | 1/2017 | Johnson ............. A01K 23/00 |
| 2017/0020101 A1* | 1/2017 | Parker ............... A45F 3/02 |
| 2017/0325420 A1 | 11/2017 | Torres |
| 2018/0359990 A1* | 12/2018 | Graham .............. A45F 3/02 |
| 2019/0289813 A1* | 9/2019 | Hayashi ........... A01K 1/0254 |

OTHER PUBLICATIONS

"Petoga Couture," Amazon.com:Alfie Pet by Petoga Coutere—Reversible Pet Sling Carrier, Feb. 4, 2019, pp. 1-8.

Monkey Mat, monkeymat.com: Fur-Eez Portable Pet Sling Carrier, Aug. 22, 2019, pp. 1-2.

Parapup Convertible Clutch/Sling Bag Totes, New Ways to Keep You (and Your Pet) Moving, Aug. 2, 2019; pp. 1-8.

Chicobag, "Keychain Tote," www.chicobag.com/product, Aug. 22, 2019, pp. 1-6.

Chicobag, "Large Capacity Reusable Shopping Bag," Sep. 4, 2019, pp. 1-6.

* cited by examiner

COLLAPSIBLE PET CARRIER

RELATED APPLICATIONS

This application is a continuation-in-part of design patent application Ser. No. 29/678,134, filed on Jan. 25, 2019 and claims priority in part therefrom, under 35 USC § 120. The '134 application is incorporated by reference herein.

FIELD OF THE INVENTION

The present invention relates to collapsible lightweight pet carriers which collapse into a sewn-in pocket pouch and which have an internal leash which safely secures a pet in place within the carrier while not unduly restricted the movement of the pet within the pet carrier during transport of the pet.

BACKGROUND OF THE INVENTION

Among related patents include U.S. Pat. No. 6,286,461 of Martz, which discloses an inside leash connectable to a pet collar in drawing FIG. 7 and the text of Martz at column 4, lines 47-54. Martz's leash appears to be short and extends from an upper surface of an interior wall of the Martz pet carrier.

U.S. Design Pat. D677,011 of Cirincione discloses a pet carrier with rigid walls and bottom floor. The shape is not flexible or compactable. The materials do not conform to the pet. The mesh panel is in the side which limits its use as a "viewing window" for pets such as rabbits, ferrets, guinea pigs, etc.,—who sit in the bottom of the bag and do not reach over the top, but instead use the window to look out. Cirincione has two handles, which prevent its use as being carried over the shoulder.

U.S. Design Pat. D685,952 of Dixon discloses a pet carrier that has rigid sidewalls and a rigid bottom. The shape is also not flexible or compactable. The materials do not conform to the pet. Dixon '952 has two handles and a top that zips closed.

U.S. Design Pat. D717,502, also of Dixon, also discloses rigid sidewalls and a rigid bottom. The shape is also not flexible or compactable. The materials do not conform to the pet.

U.S. Design Pat. D547,059 S of Keller for a bag in general discloses not a zipper closure, but a cinch with toggle.

The non-patent literature reference of Fur-Eez discloses a sling, namely a flexible strap or belt, used in the form of a loop to support or raise a weight. In Fur-Eez, there is provided a separate removable pouch. Fur-Eez's "safety clips" are attached to the storage pouch, not to the pet carrier, are removable and are non-adjustable.

US Patent Application Publication 2017/0325420 A1 of Torres discloses a generally tall rectangular box shape. Torres '420 also shows the addition of an auxiliary exterior pocket. Torres '420's bag has two straps Also the "safety collar clip" in the Torres '420 bag (see unnumbered eyelet clip in FIG. 2) is located high on one side wall, thereby unduly restraining the pet dog by its collar, severely restraining the pet dog in an awkward position while being transported. Torres '420's bag also has a rigid bottom, and while it "folds" into a smaller size, it does not "compact and collapse" into a pocket-sized ultraportable carrier. This still takes up significant space.

U.S. Pat. No. 3,850,144 of Springer discloses an adjustable shoulder strap, but it also has a rigid bottom and has a hole for the pet to stick its head out; which can be a safety hazard. U.S. Pat. No. 4,301,547 of Bloise and U.S. Design Pat. 7,395,555 of Aldridge disclose garments that have sewn-in integral pouches within which the garments are stored in integral pockets when not worn.

U.S. Pat. No. 4,977,857 of Slawinski discloses a pet carrier with a wheeled chassis (which obviously cannot collapse into a soft pocket) and it is provided with a collar hook or ring 30 with a short strap attached to an upper inner side wall, to attach to a collar like Martz '461. But Slawinski '857 has the same shortcomings of Martz '461 (i.e., a short leash on interior upper side wall that only attached to the collar, keeping the pet too restrained, and possible choking).

U.S. Pat. No. 7,617,917 B2 of Hai discloses a pet leash 74 but it attached to the inside of an auxiliary exterior pocket 62 shown in drawing FIGS. 10 and 11, where the leash can extend through a slot 75 in the pocket 62.

U.S. Pat. No. 5,671,698 of Farrugia discloses in FIG. 5 a longer leash 23 with a hook snap fastener to attach to a pet collar. Unlike Martz and Slawinski with short leashes attached to upper inside walls of pet carriers, in Farrugia's leash 23 is long, so that in Farrugia the pet can extend its full body outside of the pet carrier.

The non-patent literature reference of Bark & Bag discloses a sling shape. The safety collar clip is removable, and affixes to one side of the bag (which is not as safe as the collar leash of the present invention, which is sewn-in to the center middle floor of the carrier). The large sized Bark & Bag carrier sling is not convenient to have on a user all the time. When closed, it is a half-moon shape has a zipped pocket on the outside. When opened, the flap that was the pocket just hangs down, unless the user zips it back up—in this regard it is not an "integrated" pocket but is an external attached pocket attached to the bag (while stitched on, it is not structurally part of the bag).

The non-patent literature reference of the Timetuu Pet Sling Carrier discloses it does not stuff into the exterior pocket (the carrier is too big to fit). It comes with a separate stuff sack that is not actually integrated into the structure of the bag itself. The TimeTuu Pet Sling Carrier has a "sling" shape, not a bag shape. It does not offer ventilation of any kind to keep the pet from overheating. The collar clip is sewn into the top of one side of the strap. Therefore, it is not in the correct position to safely restrain a dog if the dog moves. It is also made of bulky thick material.

The non-patent literature reference of Alfie Pet—Chico Reversible Pet Sling Carrier discloses the "safety collar clip" is not sewn in/permanently attached to the bag. It simply wraps around the strap and clips to itself. It does not have a pocket. It is a "sling" shape, not a bag shape. It does not offer ventilation of any kind to keep the pet from overheating. It is made of bulky thick material.

With respect to non-analogous shopping bags that do not function as pet carriers, the non-patent literature reference of Chico bag, (i.e., the Micro Parrot Green shopping bag) discloses a bulky storage pouch sewn into the side thereof, but it is not a flat pocket.

OBJECTS OF THE INVENTION

It is therefore an object of the present invention to provide a collapsible pet carrier which is lightweight and which folds into an integral sewn-in pocket for storage.

It is also an object of the present invention to provide a collapsible pet carrier which includes an internal leash which safely secures a pet in place within the carrier while not unduly restricting the movement of the pet within the pet carrier during transport of the pet.

It is also an object to provide a collapsible pet carrier with an adjustable shoulder strap which can be worn cross body by the user so that it will not slip from the body of the user.

It is also an object to provide a collapsible pet carrier which has a screened ventilation panel to moderate the internal air temperature of the pet carrier bag, with an adjustable shoulder strap.

It is also an object of the present invention to provide a pet carrier with a rectangular shape which minimizes the chances of a pet escaping or slipping out therefrom during use.

Other objects which become apparent from the following description of the present invention.

SUMMARY OF THE INVENTION

In keeping with these objects and others which may become apparent, the present invention is a collapsible pet carrier bag with an integral sewn-in exterior pouch pocket, into which the collapsed, folded pet carrier folds therein, where the collapsible pet carrier can be made of a variety of lightweight collapsible, foldable materials, such as synthetic material including nylon or polyester, or natural materials such as linen, cotton or hemp. The collapsible pet carrier bag includes a ventilation screen and an adjustable shoulder strap to keep the pet carrier on the body of the user during transport of a pet therein. An important feature is an internal leash extending upward from a central attachment on the floor of the inside of the collapsible pet carrier, extending upward a height "H" to a collar clip at a top distal end thereof. In that fashion, the leash is long enough to allow the pet some movement within the pet carrier bag, but not too long to provide a choking hazard around the neck of the pet while the pet is within the pet carrier.

In general, the collapsible pet carrier includes:
1) a collapsible container of soft durable material having an open top with a shoulder strap extending between opposite sides of the open top;
2) the container being box shaped having respective front and back panels connected by respective opposite sides of the container;
3) the front panel of the container containing an open mesh section for providing visibility and improved ventilation for a pet whose head is below the top opening;
4) the container having one side panel of the opposite side panels having an integral pocket for self-storage of the carrier when collapsed;
5) an internal leash, such as a strap for the pet, has a proximal end attached to an interior portion of a bottom panel of the container; and,
6) the internal leash is adjustable in length for pet comfort and safety, thereby avoiding an excessively short or long length of the internal leash being a choking hazard for the pet.

Preferably the proximal end of the leash is attached to a central location of the bottom panel convenient for any pet orientation within the container holding the pet therein and has a distal end with a spring clamp for engaging a collar worn by the pet within the carrier. Preferably a pre-determined length of the leash extends up to a top open end of the container, and wherein the length of the leash combined with the spring clamp does not exceed more than twenty five percent of a pre-determined height of the respective front and back panels of the container. Preferably also, the leash has a length of between about 9 inches to about 10.5 inches in length.

The pet carrier's integral pocket forms a pouch for storing the container therein, and the pouch has a closure, such as a zipper, with a loop for engaging a second leash, which is used for walking the pet with the pouch containing the pet carrier and attached leash therein.

In the present invention, the collar clip is sewn into the bottom center of the pet carrier (and it functions better than if it were sewn into the sidewall) because no matter which way the pet is facing, the collar clip holds them safely to the center point of the bag. This gives them less movement, so they stay secured in place. With other clips sewn into the side panel of the bag, or attached to the handle or strap of a bag, when the pet is facing one way, the clip may be at a proper length to hold the pet in the bag; but when the pet is facing the other way, the clip will not be in the proper place. The clip of the present invention is always holding them to the center point of the carrier, so they are secure no matter their position.

In the collapsible pet carrier of the present invention, the carrier does have thin fabric side panels (not rigid walls) but has no rigid structure and is flexible and compactable. The mesh panel is in the front (not the side) and this is better because it serves as a "viewing window" for pets such as rabbits, ferrets, guinea pigs, etc.—who sit in the bottom of the bag and do not reach over the top, but instead use the window to look out. The collapsible pet carrier of the present invention has one adjustable shoulder strap (better because it fits every member of the family). The collapsible pet carrier of the present invention does not have a closeable zippered top and is open all the time at the top and it accommodates many sizes of pets.

The collapsible pet carrier of the present invention does have side panels (not walls) but has no rigid structure and is flexible and compactable. The collapsible pet carrier of the present invention has one adjustable shoulder strap (which is better because it fits every member of the family), and it can be worn cross-body which is safer for the pet because the carrier will not slip off the shoulder.

The collapsible pet carrier' storage clip is removable and attaches to the collapsible pet carrier of the present invention's zipper and is not a cinch which is integrated. Additionally, the collapsible pet carrier of the present invention bag has an internal leash with a "collar clip" sewn into the inside/bottom/center of the bag. The centrally located leash strap, which is sewn directly to the central portion of the inside bottom of the carrier itself, is not removable, and is slightly adjustable.

The collapsible pet carrier of the present inventions does not fit the definition of a "sling," defined as "a flexible strap or belt used in the form of a loop to support or raise a weight." In contrast, the collapsible pet carrier of the present invention is a rectangular bag. The collapsible pet carrier of the present invention has a storage pouch which is integrated into the bag side panel and is not a separate removable pouch. The present invention's collapsible pet carrier also has a mesh ventilation panel as part of the front panel.

As also noted above, the location of the safety clip of the present invention is safer for pets no matter their size or direction in the bag and it is adjustable for different sizes of dogs.

The pet carrier of the present invention is completely collapsible, making it ultraportable and the collapsible pet carrier does not have a small hole for the pet to stick its head out of, because that causes safety concerns for the health of the pet.

On the collapsible pet carrier of the present invention, the pet carrier storage pouch has a zipper on only the top side (better because there is less chance of fabric getting caught in the zipper). Also, when unfolded, the containment structure of the pet carrier of the present invention (the pouch) becomes a storage pocket integrated into the side panel of the bag (for dog treats, keys, etc.). It becomes a useable feature of the product itself, so it is not only for pet carrier storage purposes. As a result, in the collapsible pet carrier, the storage containment structure is also a storage pocket integrated into the side panel of the bag itself.

The pet carrier of the present invention is not provided with a wheeled chassis (which obviously cannot collapse into a soft pocket) and does not have a collar hook or ring with a short strap attached to an upper inner side wall, to attach to a pet's neck collar—(i.e., the pet carrier of the present invention does not have a short leash on interior upper side wall that only attached to the collar, keeping the pet too restrained and possible choking). In contrast, the longer central interior leash is sewn into a central interior floor portion in the collapsible pet carrier of the present invention.

In the collapsible pet carrier, the centrally sewn-in interior leash is longer than prior art short hooks that attach a pet's collar to an interior wall at the pet's neck level, but short enough to allow the pet some movement in the carrier while the pet's head is outside of the carrier, and the leash is not too long, so that it will not wrap around the pet's neck in an unsafe choking configuration.

The collapsible pet carrier of the present invention is an integral one-piece unit, which has a pocket that is structurally integrated into the bag itself it's not removable. The ventilation sub-panel of the present invention is provided to keep the pet from overheating, and it provides a viewing window for small or reclining pets. When not in use, the entire pet carrier and shoulder strap fold and collapse into the integral sewn-in storage pocket, which may have a hook fastener to attach the stored pet carrier to the handle of the pet's conventional walking leash when the pet is no longer carried but walking with the pet's owner or other care giver.

BRIEF DESCRIPTION OF THE DRAWINGS

The present invention can best be understood in connection with the accompanying drawings. It is noted that the invention is not limited to the precise embodiments shown in the following drawings, in which.

DETAILED DESCRIPTION OF THE INVENTION

Figure 1:
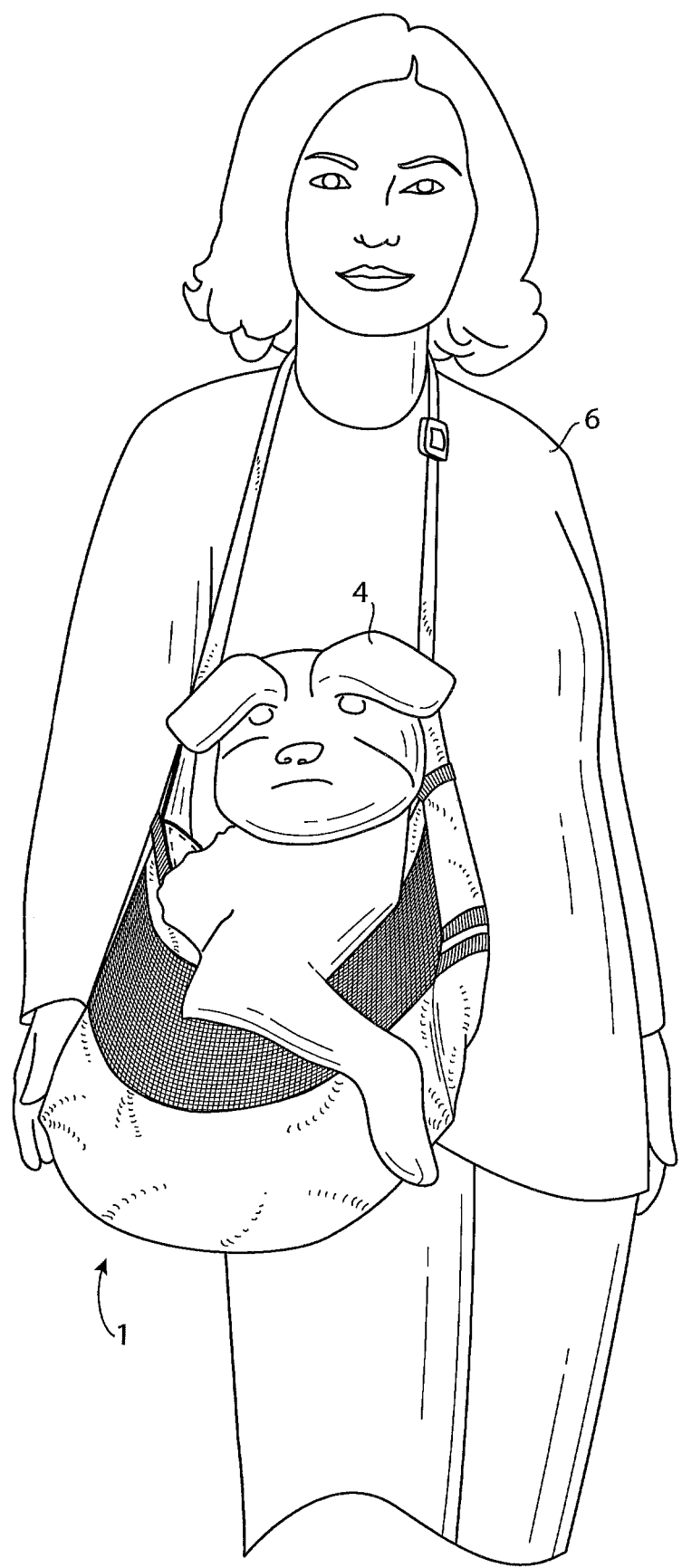
FIG. 1 is a perspective view of the collapsible pet carrier of the present invention, shown in use carrying a pet therein.

FIG. 1 shows a person 6 using collapsible pet carrier 1 of this invention to carry pet dog 4. It is noted that carrier 1 largely conforms to the shape of the pet being carried, especially for those pets of a larger size within the 15-pound weight limit.

Figure 2:
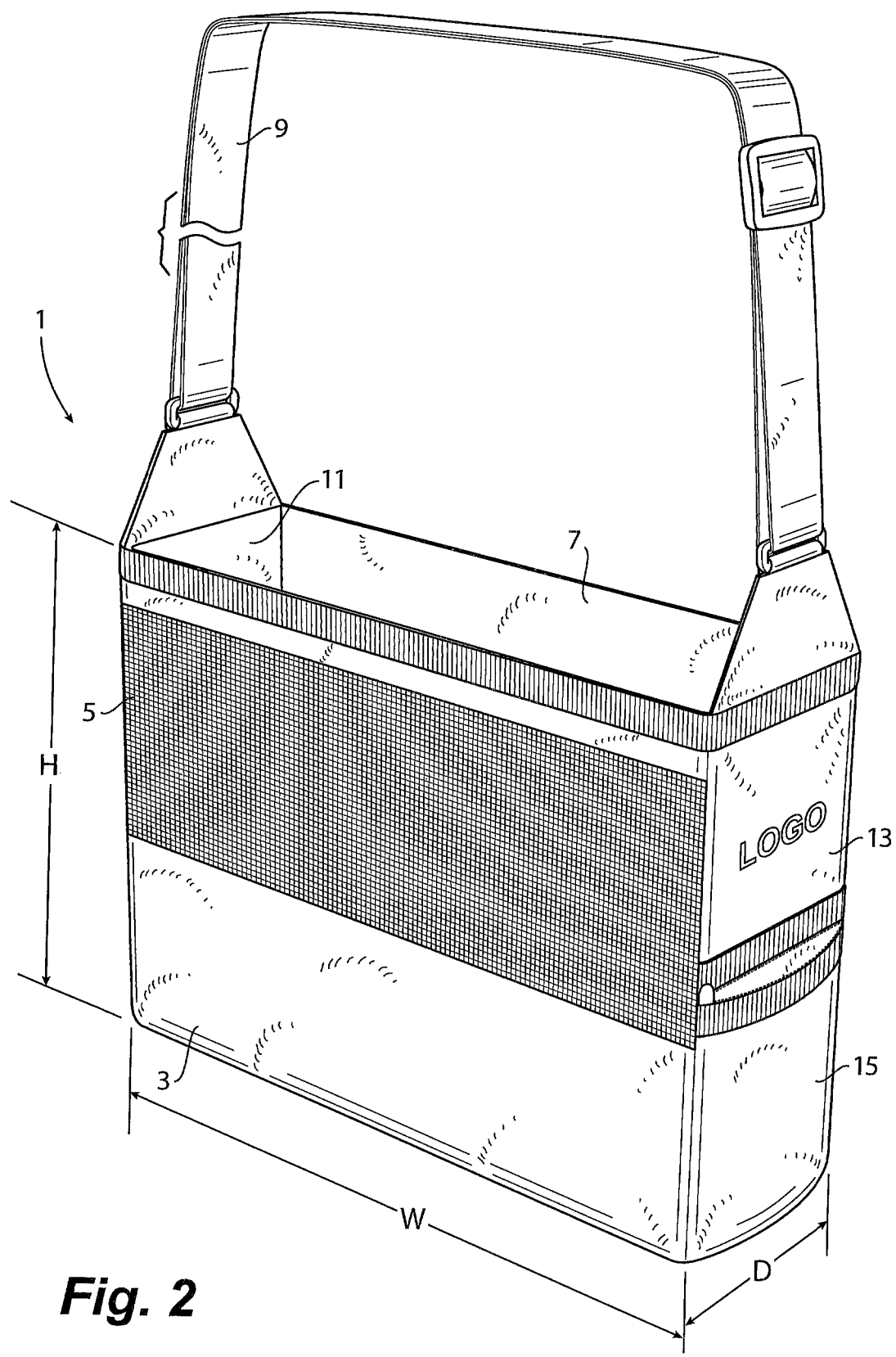
FIG. 2 is a perspective view of the collapsible pet carrier, shown in the rectangular box shaped body, with a ventilation window screen, an adjustable shoulder strap, where a bracket indicates adjustable length, and an integral sewn-on pocket for self storage of the collapsed carrier therein.
Figure 4:
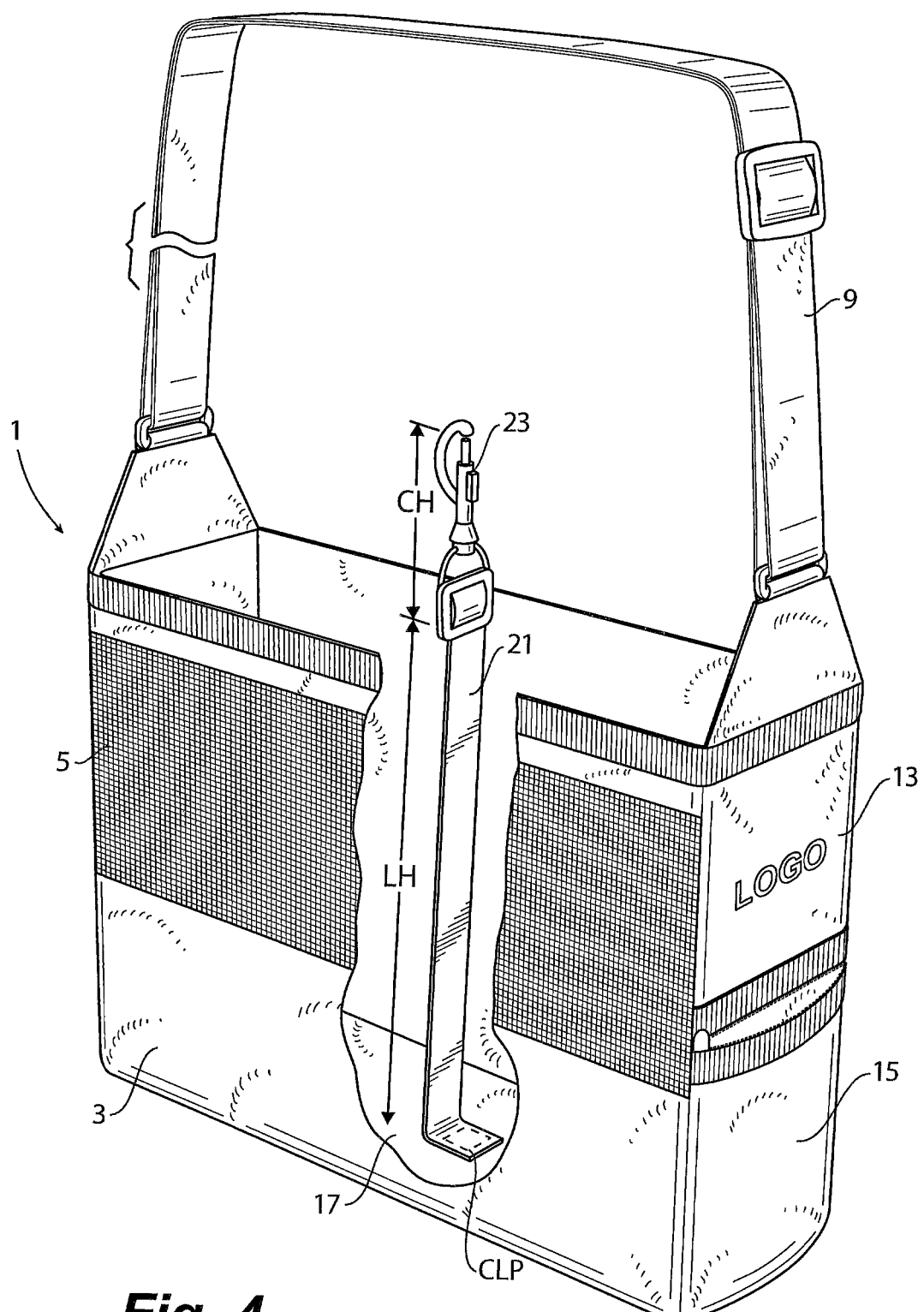
FIG. 4 is a perspective in partial cutaway, showing an internal leash extending upward from a central attachment on the floor of the inside of the collapsible pet carrier, extending upward a height "H" to a collar clip at a top distal end thereof.

In a preferred embodiment, as shown in FIGS. 2 and 4, the pet carrier 1 is box-like in shape, although it completely collapses down to fit within its own pocket pouch 15. The wide front panel 3 and rear panel 7 are about 9 inches in height "H" by about 14 inches in width side "W". Each left and right respective side panels 11 and 13 are about 9 inches in height and about 4 inches in depth "D", so the side panels 11 and 13 are narrower than the front and rear panels 3 and 7 of the pet carrier 1. An important dimension shown in FIG. 4 is the centrally located position "CLP" of an internal leash strap 21 with strap clamp 23 on top, to attach the pet's leash thereto. The internal leash strap 21 preferably has a height "LH" which restrains the pet from jumping out of the carrier 1, but does not unduly restrain the pet uncomfortably with a side hook as in the Martz and Slawinski patents, which holds the pet's neck tightly to an internal side panel. Also, the leash 21 is short enough so that it will not unduly wrap around the neck of the pet, causing choking problems. The leash strap 21 is therefore about 9.0 inches in height "LH," enlargeable to about 10.5 inches in height, and the strap clamp hook 23 hook is about 1.5 inches in length "CH". Therefore, the combined height LH of the leash strap 21 in combination with the length "CH" of the strap clamp hook 23 is about 10.5 to 12 inches, which is long enough to allow the pet to move within the interior of the pet carrier 1, yet short enough so that it does not unduly wrap around the neck of the pet, thereby reducing choking possibilities, but without holding the pet by its neck collar in one position located near the top of an inside wall. Therefore, the length of the leash strap 21 preferably extends up to the top of front panel 3 and back panel 7, extendable up outside of the top of the pet carrier 1 with the addition of the length "CH" of the strap clamp hook 23. When the leash strap 21 is extended fully to about 10.5 inches in length, the combined length of the extended leash strap 21 plus the length of the strap clamp hook 23 is a length not exceeding more than 25 percent of the height "H" of the respective front and back panels 3 and 7.

Figure 3:
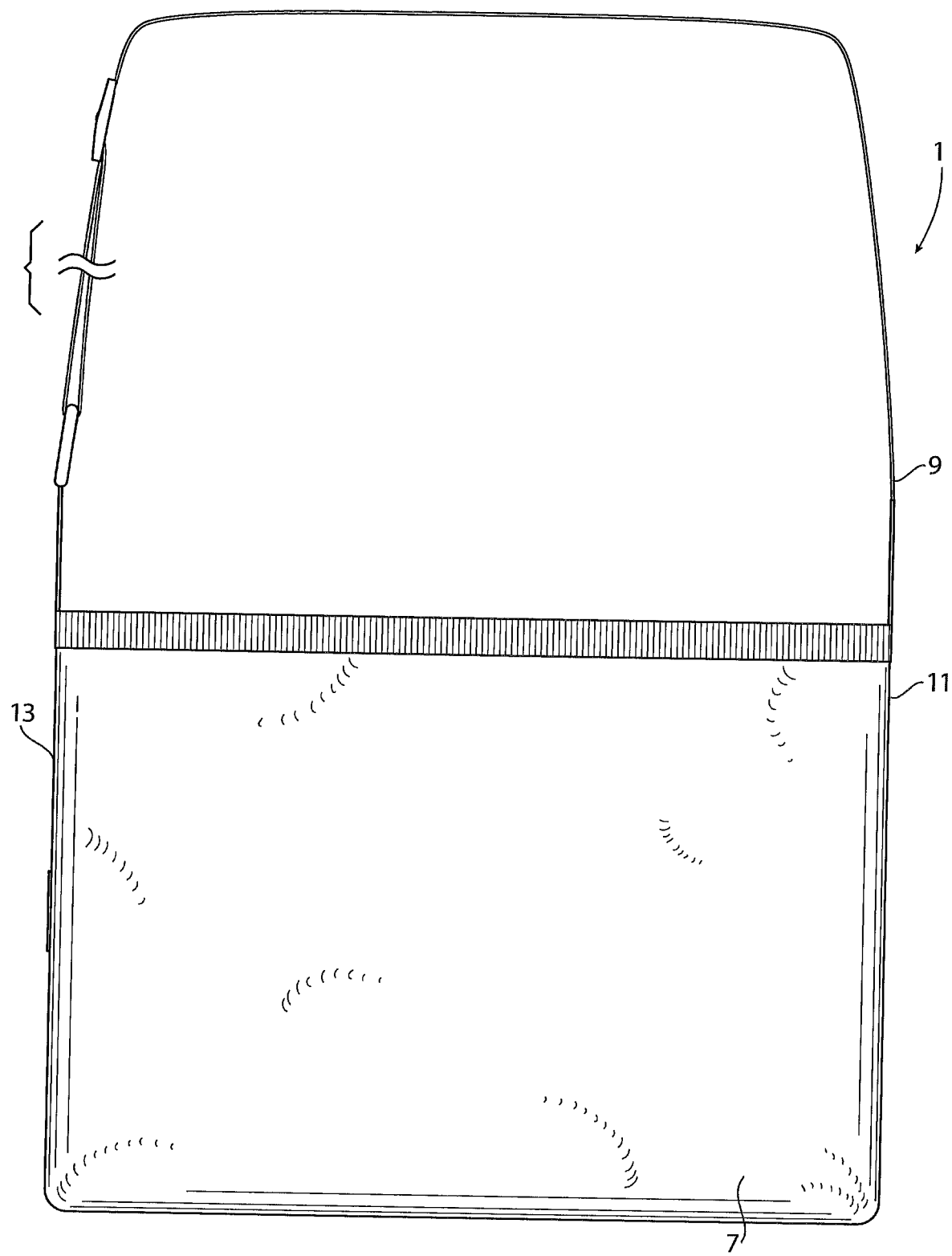
FIG. 3 is a rear view thereof.

FIGS. 2-4 reveal carrier 1 to be a rectangular box shape with five sides and no cover, so that the pet, when sitting erect, can freely extend its head out of the pet carrier 1. Carrier 1 is constructed of soft durable material throughout. As shown in FIG. 2, carrier 1 has adjustable strap 9 which can accommodate cross-body carrying. Back panel 7 would normally be against the user's body. Front panel 3 has an open mesh top section 5 for improved ventilation. Open mesh section 5 is preferably about 9 inches in width, extending across the front panel 3 of the pet carrier 1, and about 4 inches in height. This location and size of the mesh panel 5 also affords visibility for smaller pets such as rabbits or ferrets which generally have their heads below the top of front panel 3. Side panel 11 has no features, but the other side panel 13 has an integral sewn-on pocket 15 for self storage of the collapsed carrier 1. When the per carrier is in use, the pocket 15 can be used by the user person 6 to store items such as a wallet or cell phone or other small objects therein.

FIG. 3 is a rear view of the pet carrier 1 showing the full unencumbered panel 7, which in use, normally rests against the body of the user person 6.

FIG. 4, in partial cutaway, offers a view of the central portion of collapsible pet carrier 1 floor panel 17 where adjustable internal leash 21 is attached preferably to a central leash position "CLP" therein. Spring clamp 23, such as, for example, a clip, attaches leash 21 to the pet collar at the appropriate height "H" of the leash strap 21. The attachment location "CLP" in the center of floor panel 17 permits leash 21 to attach conveniently regardless of the pet orientation. The length of leash 21 can also be adjusted for pet comfort and safety regarding being a "too long" choking hazard.

Figure 5:
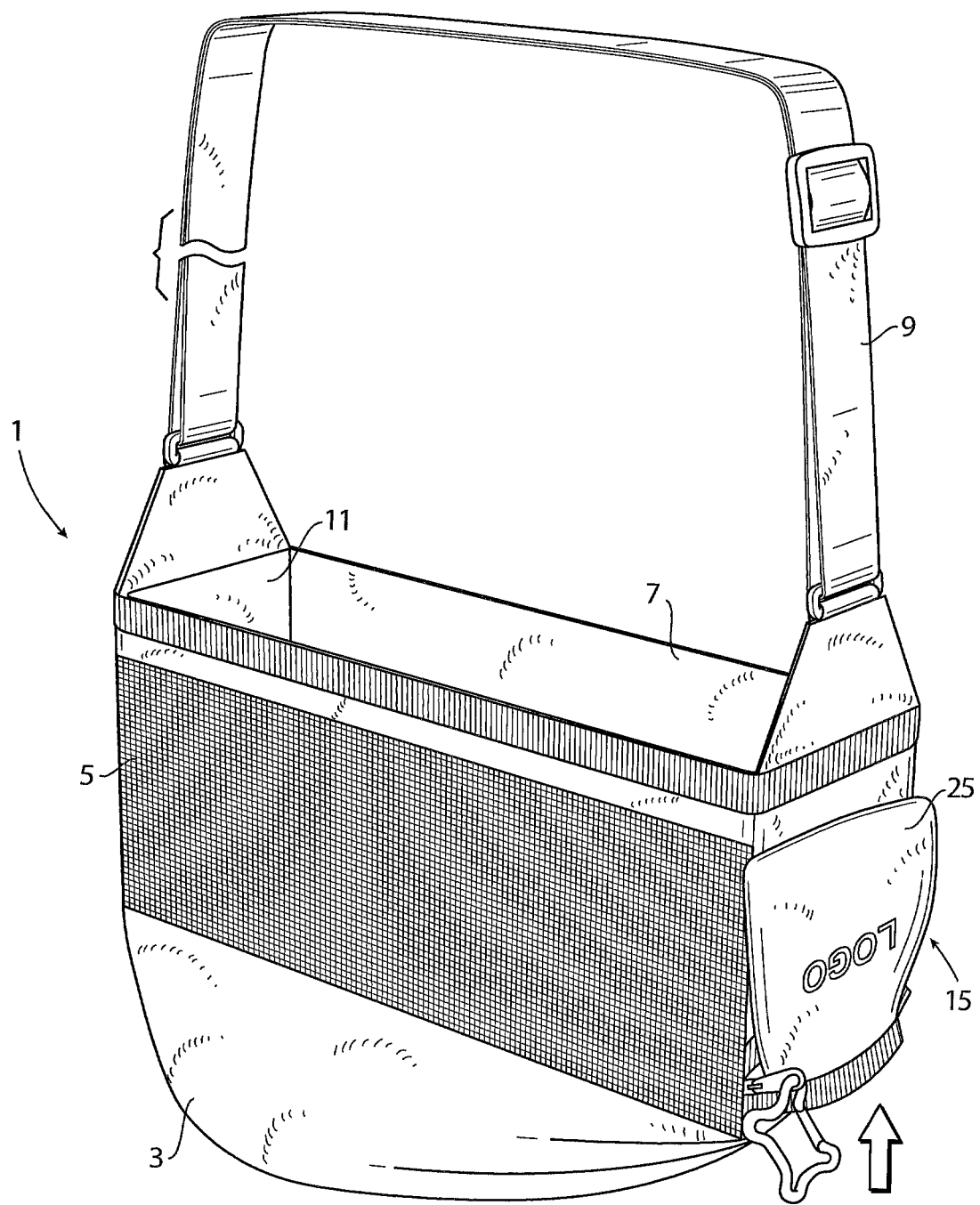
FIG. 5 is a perspective view of the collapsible pet carrier beginning to collapse and fold into the integral sewn-on pocket for self storage of the collapsed carrier therein.
Figure 6:
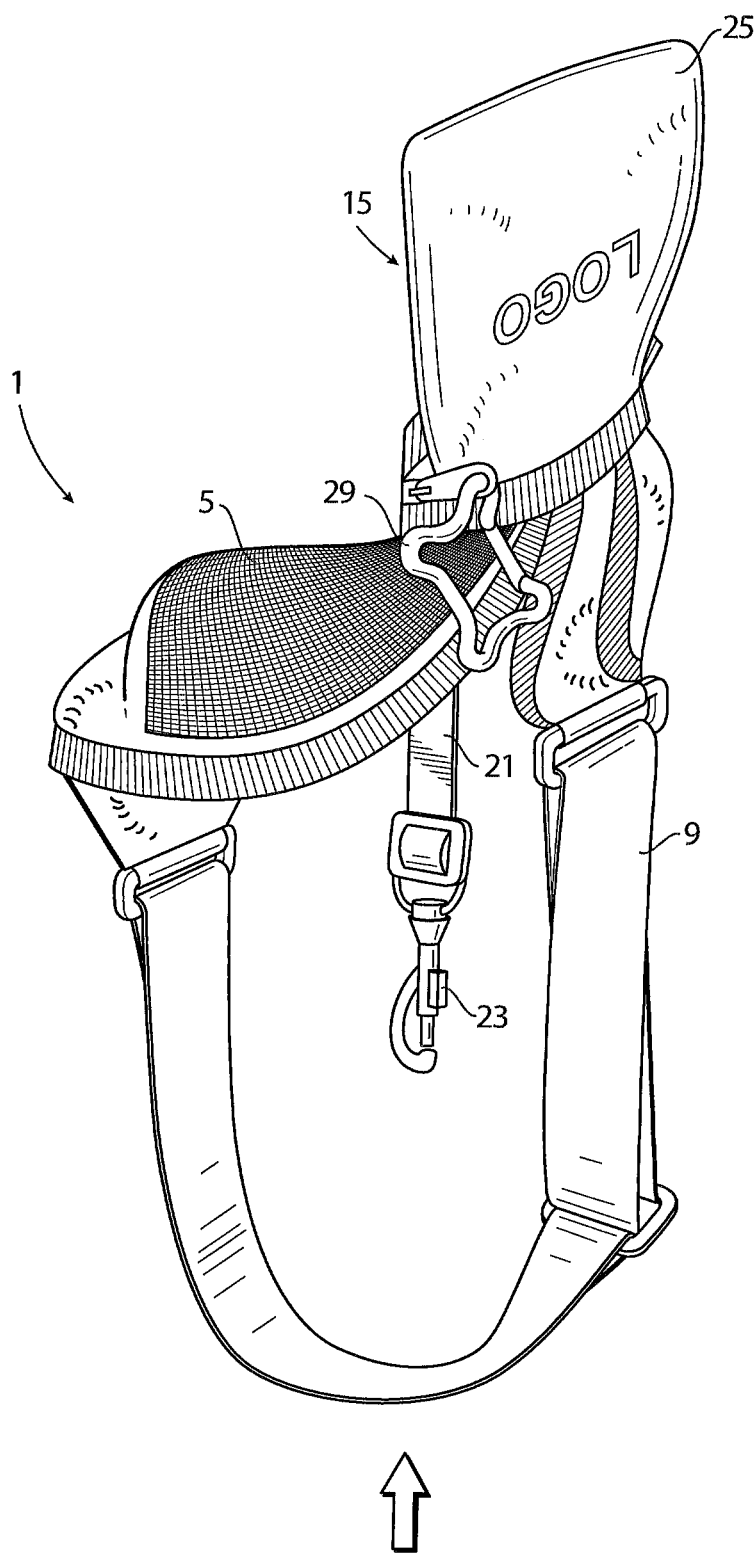
FIG. 6 is a perspective view of the collapsible pet carrier being further collapsed and folded into the integral sewn-on pocket for self storage of the collapsed carrier therein, wherein the inner portion of the sewn-in pocket is exposed when pulled through the zipper.

FIGS. 5 and 6 are two snapshots in the process to collapse and store pet carrier 1 in its integral, sewn-in attached pocket 15, without the need of a separate carry pouch for the storage of the pet carrier 1 therein. For example, FIG. 5 shows the start of the process whereby an empty pouch 15 is pushed out from the inside of carrier 1; this will automatically start deforming the bottom of carrier 1. Note that the pocket logo 25 is now visible but upside down as shown in FIG. 5. The rest of the process is simply continuing to stuff the collapsible material of pet carrier 1 into pouch 15 (including the shoulder strap 9 as shown in FIG. 6) in the direction shown by the arrows pointing up. The action required is more akin to stuffing a tiny pillow with cotton balls than folding.

Figure 7:
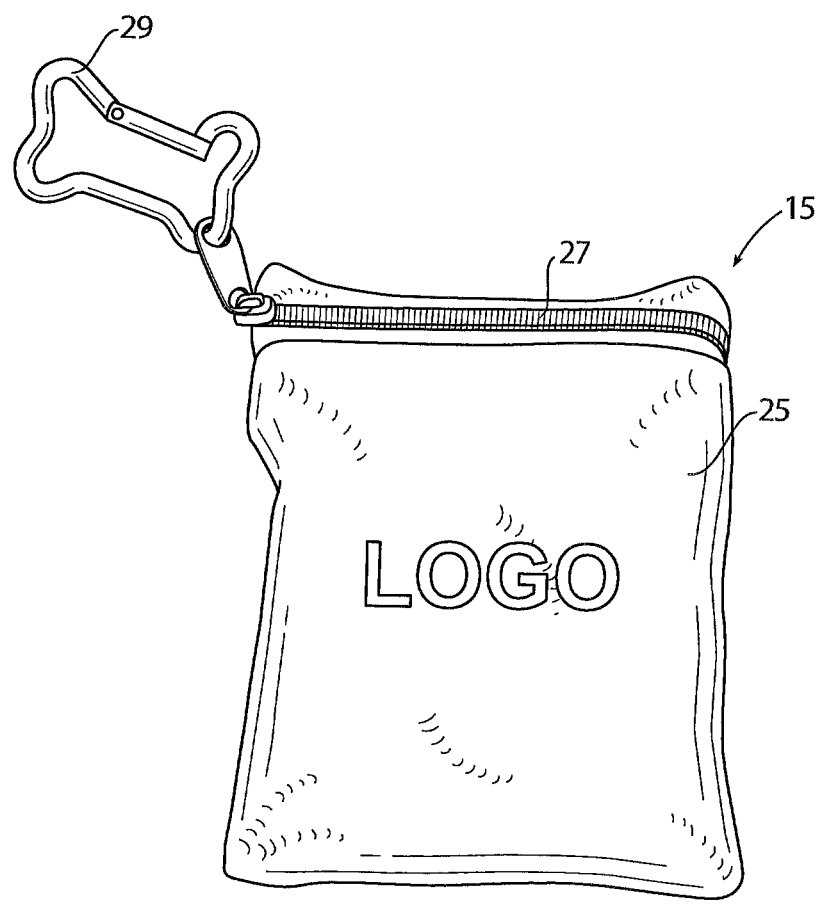
FIG. 7 is a side elevation view of the integral sewn-in pocket pouch having the collapsible pet carrier completely folded, collapsed and stored therein, wherein the bulk of the pet carrier is stuffed into the inverted pocket, resulting in the storage packet pouch being closed by a zipper or other closure element fastener when the collapsed pet carrier is fully stored therein.

At the end of the process as shown in FIG. 7, a stuffed pouch 15 emerges with logo panel 25 on one side, zipper 27 on top and carabiner clip 29 (possibly in the outline of a dog bone).

Figure 8:
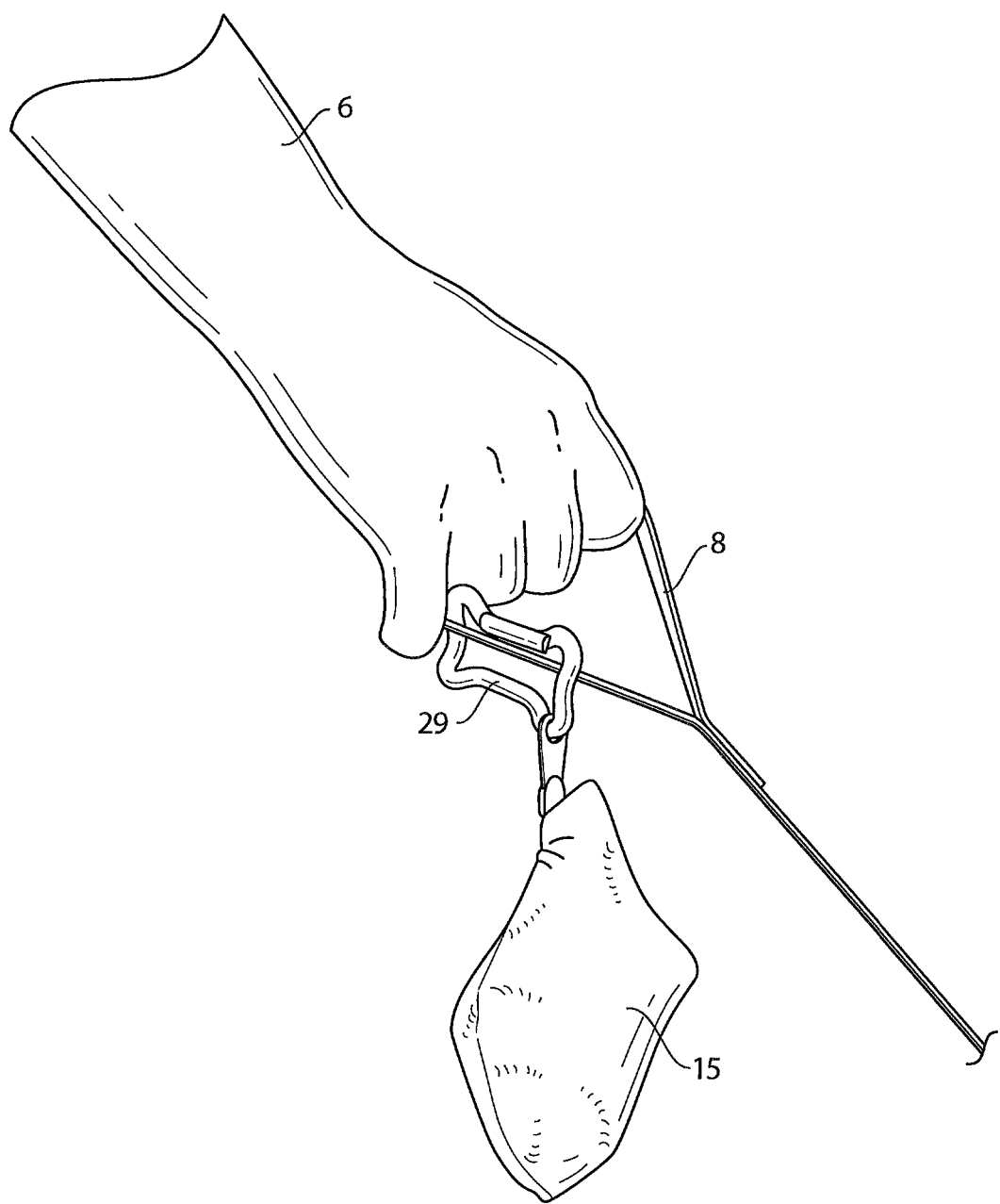
FIG. 8 is a perspective view of the integral sewn-in pocket pouch having the collapsible pet carrier completely folded, collapsed and stored therein, and attached by a fastener, such as a carabiner clip, to a user's dog leash for transport when not in use.

FIG. 8 shows the collapsed pet carrier 1 stuffed inside pouch 15 and conveniently attached to the loop 8 of a leash using clip 29. While pet carrier 1 is in use, attached pouch 15 could have many uses such as for holding a cell phone or pet treats.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A collapsible pet carrier comprising:
    a collapsible container of soft durable material having an open top with a shoulder strap extending between opposite sides of said open top;
    said container being box shaped having respective front and back panels connected by said opposite sides of said container;
    said front panel of said container containing an open mesh section for providing visibility and improved ventilation for a pet whose head is below said top opening;
    said container having one side panel of said opposite side panels having an integral pocket configured for self-storage of said carrier when collapsed;
    an internal leash for said pet having a proximal end attached to an interior portion of a bottom panel of said container; and,
    said internal leash being adjustable in length for pet comfort and safety avoiding a length being a choking hazard.

2. The pet carrier of claim 1 in which said proximal end of said leash is attached to a central location of said bottom panel convenient for any pet orientation within said container.

3. The pet carrier of claim 2 in which said leash has a distal end with a spring clamp for engaging a collar worn by said pet within said carrier.

4. The pet carrier of claim 2 wherein a pre-determined length of said leash extends up to a top open end of said container.

5. The pet carrier of claim 3 wherein said length of said leash combined with said spring clamp does not exceed more than twenty five percent of a pre-determined height of said respective front and back panels of said container.

6. The pet carrier of claim 5 wherein said leash has a length of between about 9 inches to about 10.5 inches in length.

7. The pet carrier of claim 3 in which said integral pocket forms a pouch storing said container, said pouch having a closure with a loop for engaging a second leash for walking said pet with said pouch containing said pet carrier and attached leash.

8. The pet carrier of claim 7 in which said closure is a zipper.

9. The pet carrier of claim 1 wherein said container is made of a lightweight collapsible, foldable material, selected from the group consisting of a synthetic material including nylon and polyester, and a natural material including linen, cotton and hemp, and combinations thereof.

10. A method of carrying a pet comprising the steps of:
    placing the pet in a collapsible container of a lightweight soft durable material having an open top with a shoulder strap extending between opposite sides of said open top;
    said container being box shaped having respective front and back panels connected by said opposite sides of said container;
    providing said front panel of said container with an open mesh section for providing visibility and improved ventilation for a pet whose head is below said top opening;
    said container having a side panel with a side pocket configured for self-storage of said carrier when collapsed;
    said container having an internal leash for said pet with a proximal end attached to an interior portion of a bottom panel of said container and a distal end with a spring clamp for engaging a collar worn by said pet within said carrier;
    said internal leash being adjusted in length for pet comfort and safety avoiding a length being a choking hazard;
    removing said pet from said container;
    opening said side pocket integrally mounted on an outside of said side panel of said container;

pushing said side pocket inside out and stuffing said container into said side pocket forming a pouch containing said container; and using a closure on said pouch to close said pouch with said container within.

11. The method of claim 10 in which said proximal end of said leash is attached to a central location of said bottom panel convenient for any pet orientation within said container.

12. The method of claim 11 in which said leash has a distal end with a spring clamp for engaging a collar worn by said pet within said carrier.

13. The method of claim 11 wherein a pre-determined length of said leash extends up to a top open end of said container.

14. The method of claim 12 wherein said length of said leash combined with said spring clamp does not exceed more than twenty five percent of a pre-determined height of said respective front and back panels of said container.

15. The method of claim 11 wherein said leash has a length of between about 9 inches to about 10.5 inches in length.

16. The method of claim 10 in which said closure on said pouch has a loop for securing said pouch including attaching said pouch to a second leash for walking said pet with said pouch containing said pet carrier and attached leash.

17. The method of claim 13 in which said closure is a zipper.

18. The method of claim 10 wherein said container is made of a lightweight collapsible, foldable material selected from the group consisting of a synthetic material including nylon and polyester, and a natural material including linen, cotton and hemp, and combinations thereof.

* * * * *